United States Patent Office

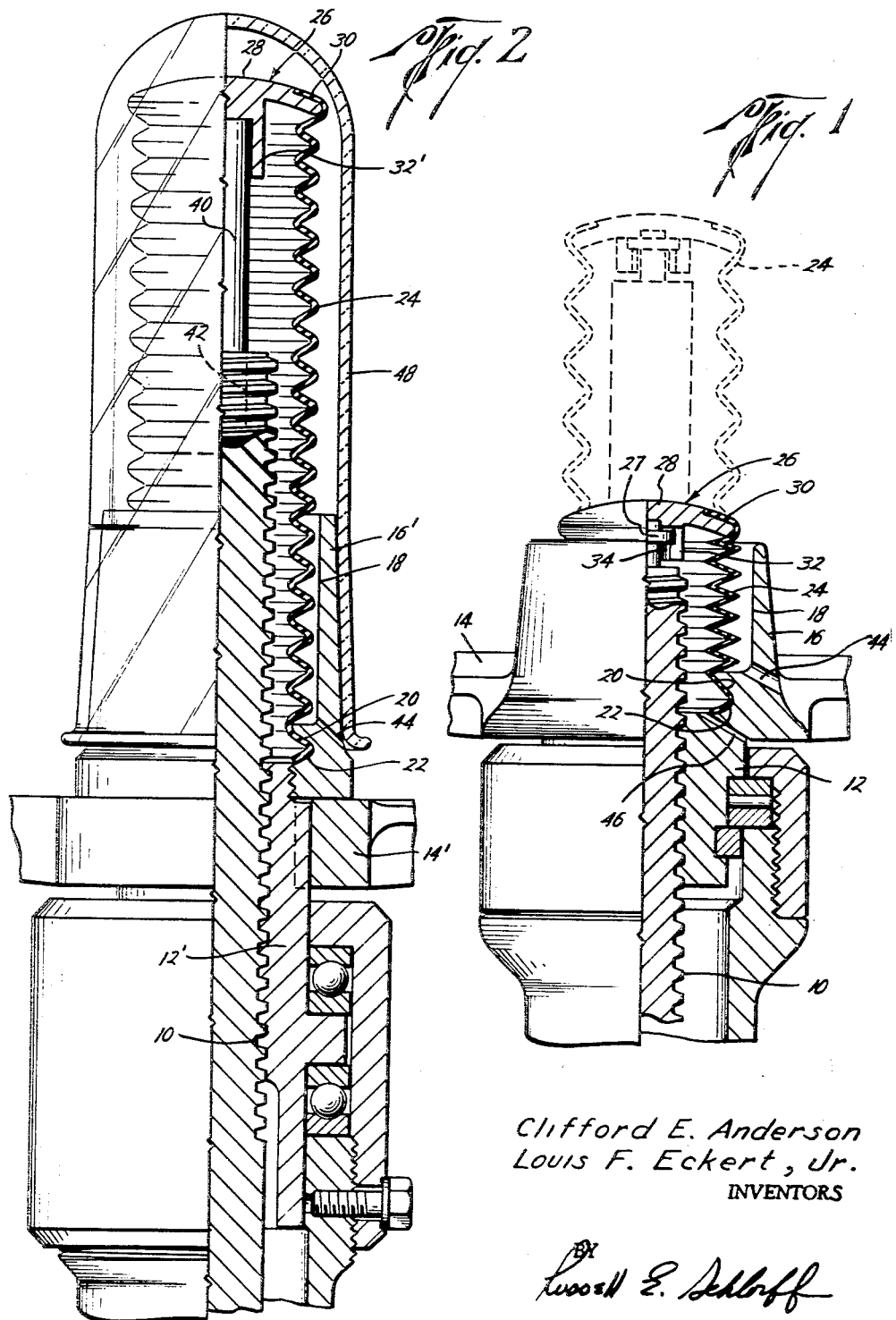

2,934,036
Patented Apr. 26, 1960

2,934,036
STEM PROTECTOR AND INDICATOR

Clifford E. Anderson and Louis F. Eckert, Jr., Houston, Tex., assignors to ACF Industries, Incorporated, New York, N.Y., a corporation of New Jersey Application April 28, 1958, Serial No. 731,251

6 Claims. (Cl. 116—125)

This invention relates to a combined stem protector and indicator for rising stem valves.

In rising stem valves, the stem of the valve is extended from and retracted toward the top of the valve during the operation thereof. While the stem is extended, which may be for prolonged periods of time, it is exposed to the atmosphere and thereby subject to the deleterious effects of being so exposed. Moreover, even though the position of the stem indicates the position of the internal valve, the stem as a rule is fairly thin and usually dull in appearance and, therefore, the position of the stem cannot be ascertained from any considerable distance.

The present invention utilizes a highly visible extendable bellows which is attached to the top of the valve and the top of the stem. As the stem extends from the top of the valve, the bellows expands and as the stem is retracted back toward the top of the valve, the bellows collapses. The bellows fully protects the stem from the atmosphere at all times. When the stem is fully retracted, the stem and bellows are housed in a cylindrical shield on the top of the valve. Since the bellows is highly visible, the position of the valve can be ascertained by a simple visual inspection. Since when fully retracted the highly visible bellows is retracted within the cylindrical shield, the likelihood of false indication from even a cursory visual inspection is virtually eliminated. To avoid a building up of a pressure within the bellows upon retraction and to prevent pulling a vacuum on extension, the cylindrical shield is so designed that the interior of the bellows is vented. The cylindrical shield is also provided with a passage to promptly drain any water between the bellows and interior wall of the shield.

It is the principal object of the present invention to provide an improved combined stem protector and indicator for rising stem valves which will protect the stem from the atmosphere and at the same time clearly indicate the position of the interior valve.

It is another object to provide an improved stem protector and indicator which when the stem is extended clearly indicates such extension and when the stem is retracted, is confined within a shield so that false indication is eliminated.

It is a further object to provide a stem protector and indicator which protects the stem from all climatic conditions, while at the same time permitting clear indication as to the position of the stem and thereby the valve.

It is a further object to provide a stem protector which without the attachment of any additional parts functions as an indicator for the internal valve controlled by the stem.

It is the specific object to provide a stem protector and indicator formed of a highly visible, colored, extendable bellows connectively attached to the operating means and the stem which when fully retracted is confined within a shield which is so designed that provision is made to vent the interior of the bellows and also to facilitate the drainage of any water between the bellows and its shield.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and is shown in the accompanying drawings, forming a part of the specification, wherein:

Fig. 1 is a vertical view partially in section of the upper section through a valve incorporating the present invention.

Fig. 2 is a view similar to Fig. 1 showing a modified form of the invention.

Referring now to the drawings, Figs. 1 shows the top section of a rising stem valve which may be a gate valve or any other type of rising stem valve in which the internal valve is controlled by the reciprocatory movement of a stem 10. The stem 10 is attached to the internal valve member (not shown) and is nonrotatively extended or retracted by means of threaded engagement with an internally threaded operating hub 12. The hub 12 may be an integral part of a handwheel 14 as shown in Fig. 1, a stem nut 12' which is keyed to a separate handwheel 14' as shown in Fig. 2 or may be a part of the gear train of a mechanical operator as is well known in the art. As the hub 12 rotates, the stem 10 nonrotatively reciprocates in relation thereto. Coaxially with the threaded hub 12 there is a cylindrical shield 16 which if desirable may be an integral part of the hub 12 as shown in Fig. 1. Located near the bottom of the inner wall 18 of the shield 16 there is an annular protuberance 20 and an adjacent annular pocket 22. An extendable bellows which forms the protector and indicator is telescoped over the stem 10 and into the shield 16. The bottom end of the bellows is frictionally engaged by the protuberance 20 and pocket 22 and is held rotatively stationary in relation to the shield.

The top of the bellows 24 is attached to a cap 26 which is rotatively attached to a headed member 27 on the top of the stem 10. The cap 26 may be a molded plastic cap having a crowned top 28 provided with an annular indentation 30 adjacent its top circumferential edge. The top fold of the bellows is engaged around the edge of the top 28, see Fig. 1. The cap 26 also has a hub portion 32 provided with a number of longitudinal slits 34 which permit the hub to expand while it is being engaged with the headed portion 27 of the stem 10. If desired, the headed member atop the stem 10 may be eliminated and a straight shaft 40 frictionally engaged with an unslit hub 32' and telescoped in a hole 42 in the stem may be used, see Fig. 2. Other ways may also be utilized to secure the cap 26 to the stem 10; however, in all cases the cap 26 should be retained in a central position in the stem 10.

It has been found that the accordion-like tubular rubber bellows, sold by U.S. Rubber Company under its trademark Multi-Flex, which are circumferentially corrugated to give flexibility, rigidity and have the ability to take movements of axial extension and compression make particularly desirable protectors; however, molded plastic or rubber bellows formed in the conventional manner are also satisfactory. In order that the protector can also function as an indicator, it is desirable to paint or mold the bellows of a highly visible color which will be plainly seen for a considerable distance.

In order to prevent false indication by the protector-indicator, the shield 16 is of such height that when the stem 10 is fully retracted the top 28 of the cap 26 will be slightly below the top of the shield 16. If the shield was not present, it would be difficult to determine from any distance whether or not the valve was fully closed since a portion of the bright bellows would be visible.

As the handwheel 14 is rotated, the bellows 24 is similarly rotated due to its frictional engagement with the protuberance 20 and pocket 22 of the hub 12. Since the cap 26 is free to rotate, as the handwheel 14 turns, the entire assembly of shield 16, bellows 24 and cap 26 rotate as a unit; therefore, no significant twisting strain is placed on the bellows 24. The only twisting strain placed on the bellows is that required to overcome the slight frictional drag of the cap. If the hub 12 is formed as part of a mechanical operator, it is possible if so desired to form the cylindrical sleeve 16 as part of the housing of such operator in which case the protector-indicator will remain rotatively stationary throughout the entire operation.

As seen in Fig. 1, the cylindrical shield 16 is provided with a passage 44 which will permit any water coming between the bellows 22 and the inner wall of the shield 18 to drain. Also, to avoid building up pressure within the interior of the bellows 22 when it is being retracted and to prevent a collapsing of the bellows 22 due to a drawing a partial vacuum when the bellows 22 is being extended, the hub 12 is provided with a vent 46.

In the form shown in Fig. 2, the shield 16' is separate from the hub 12' and is threadedly engaged with such hub. Since there is a space between the inner wall 18 and the bellows 24, snow, sleet and freezing rain may under certain conditions cake in such space. It may be desirable in certain northern locations to utilize a protective cover 48 formed of transparent plastic which is telescoped over the outer wall of the cylindrical shield 16 to prevent such caking. Since the cover 48 is transparent, it will not affect the functioning of the highly visible bellows 24 as an indicator.

In all forms of the invention, the bellows and shield act as a unit and no appreciable twisting strain is ever placed upon the bellows. The bellows being readily visible will accurately and rapidly indicate whether or not the stem is extended, especially since when the stem is fully retracted the highly visible bellows is confined in a shield.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

We claim:

1. In combination with a valve having a stem which extends from and retracts toward a portion of the valve, a stem protector and indicator for such stem, said stem protector and indicator being formed of an accordion pleated, tubular, collapsible bellows telescoped over said stem, means attaching one end of said bellows to the portion of the valve from which the stem extends, means closing the other end of said bellows so that as the stem extends the end of the stem will contact the means closing the end of the bellows whereby the bellows is correspondingly extended.

2. A handwheel for a valve having a rising stem which extends from and retracts toward the handwheel, said handwheel being provided with a hollow cylindrical shield member coaxial with the stem, the lower portion of the inner wall of said shield members being provided with an annular protuberance and an adjacent annular pocket, an accordion pleated tubular collapsible bellows telescoped over said stem and into the shield member, the end of the bellows extending into the shield frictionally engaged by the protuberance and pocket of the shield member, cap means closing the other end of the bellows, the stem rotatively attached to said cap means so that as the stem extends the bellows extends and as the stem retracts the bellows correspondingly retracts, the height of the shield being such that when the stem is fully retracted the cap means is below the top of the shield member, the shield member being provided with a passage connecting the inside of the bellows with the atmosphere and with a passage providing a drain between the inner wall of the shield member and the bellows.

3. In combination with a valve having a stem which extends from and retracts toward a portion of the valve, a stem protector and indicator for such stem, said stem protector and indicator being formed of a hollow cylindrical shield member coaxial with the stem and attached to the portion of the valve from which the stem extends, an accordion pleated, tubular, collapsible bellows telescoped over said stem and into the shield member, means to retain the end of the bellows extending into the shield, means closing the other end of the bellows, the stem attached to the means closing the bellows so that as the stem extends the bellows extends and as the stem retracts, the bellows correspondingly retracts, the height of the shield being such that when the stem is fully retracted the means closing the end of the bellows is below the top of the shield member.

4. The construction set forth in claim 3 characterized in that there is a passage between the inside wall of the shield and the bellows to drain the space between the interior wall of the shield and the bellows.

5. The construction set forth in claim 3 characterized in that there is a passage in the shield venting the interior of the bellows.

6. The construction set forth in claim 3 characterized in that a transparent plastic closed end cylinder is telescoped over the outside wall of the shield, the height of such cylinder being such to accommodate a fully extended stem.

References Cited in the file of this patent

UNITED STATES PATENTS

| | | |
|---|---|---|
| 896,864 | Spamer | Aug. 25, 1908 |
| 1,770,265 | Flowers | July 8, 1930 |
| 2,510,663 | Schuessler | June 6, 1950 |
| 2,578,630 | Hartman | Dec. 11, 1951 |
| 2,685,170 | Price | Aug. 3, 1954 |